United States Patent
Pirona

Patent Number: 6,099,045
Date of Patent: Aug. 8, 2000

[54] FITTING FOR THE CONNECTION OF PIPES BY MEANS OF PRESSING

[75] Inventor: Mauro Pirona, Pradamano, Italy

[73] Assignee: CHEMIDRO S.a.S. di Del Pin Marta & C., Italy

[21] Appl. No.: 09/122,424

[22] Filed: Jul. 24, 1998

[30] Foreign Application Priority Data

Jul. 30, 1997 [IT] Italy .................................. BS970089 U

[51] Int. Cl.$^7$ .................................................. F16L 33/00
[52] U.S. Cl. ............................. 285/256; 285/259; 285/351
[58] Field of Search .................................... 285/256, 259, 285/347, 351

[56] References Cited

U.S. PATENT DOCUMENTS

| | | | |
|---|---|---|---|
| 3,222,094 | 12/1965 | Robinson et al. | 285/256 |
| 4,603,890 | 8/1986 | Huppee | 285/259 X |
| 4,690,435 | 9/1987 | Manning et al. | 285/256 |
| 4,844,516 | 7/1989 | Baker | 285/259 X |
| 5,044,671 | 9/1991 | Chisnell et al. | 285/256 X |
| 5,370,425 | 12/1994 | Dougherty et al. | 285/256 X |
| 5,558,375 | 9/1996 | Newman | 285/351 X |
| 5,653,475 | 8/1997 | Scheyhing et al. | 285/351 X |

FOREIGN PATENT DOCUMENTS

| | | | |
|---|---|---|---|
| 2675880 | 10/1992 | France | 285/351 |
| 92009840 | 6/1992 | WIPO | 285/256 |

*Primary Examiner*—Lynne H. Browne
*Assistant Examiner*—David E. Bochna
*Attorney, Agent, or Firm*—McGlew and Tuttle, P.C.

[57] ABSTRACT

A fitting for the connection of pipes includes a body (10) having a rubber holder (11) and accommodating two toric seals (13, 14) spaced in parallel to one another, and the pipe to be connected to the fitting is threaded onto the rubber holder and is locked there by an outer pressed bushing (17). A third toric seal (15) is mounted on the rubber holder for sealing between the rubber holder (11) and the pipe connected thereto.

12 Claims, 1 Drawing Sheet

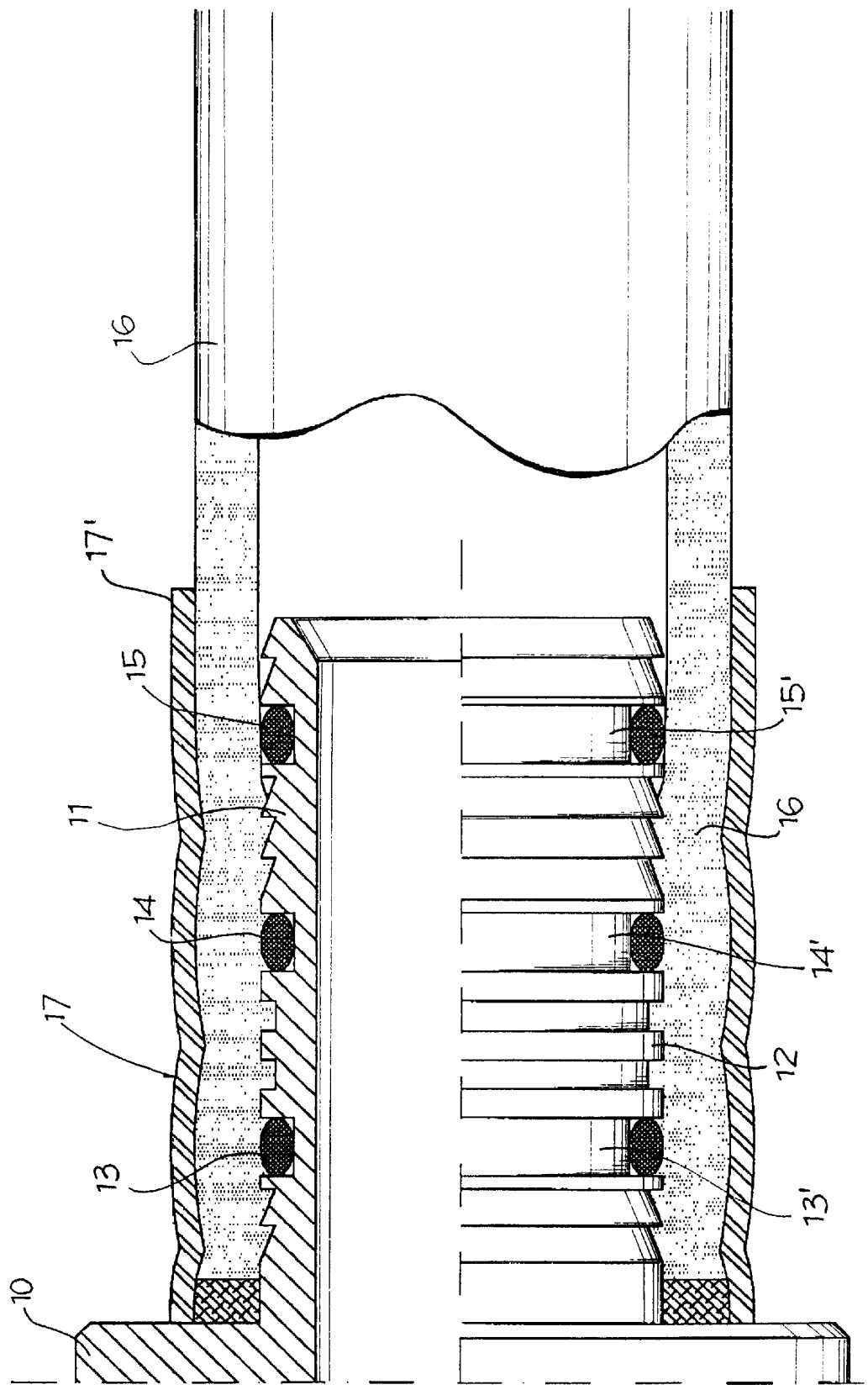

FITTING FOR THE CONNECTION OF PIPES BY MEANS OF PRESSING

FIELD AND BACKGROUND OF THE INVENTION

The present invention relates to fittings for pipes of the type made of rubber, plastic material, multilayered, etc., and more specifically to fittings for the connection of pipes by means of pressing.

Such fittings may be linear, elbow-shaped or T-shaped, with or without a male or female threaded section, but they do usually have at least one rubber-holder section to connect a pipe there. The rubber-holder section has a grooved outer surface and usually accommodates two toric seals (O-rings) that are spaced in parallel to one another.

A pipe is connected to the fitting by arranging a bushing around the pipe, threading the rubber holder in the pipe and contracting the outer bushing with a pressing tool until the pipe presses and locks onto the rubber holder.

However, the fittings of the prior-art type are not without drawbacks. In these fittings, the sealing between the connected rubber holder and pipe depends on the pair of toric seals, which are premounted on the rubber holder. But when the bushing has been compressed, the two seals undergo a very strong deflection in the related seats. These seals themselves therefore guarantee an excellent sealing, but if they are stressed by a rotation of the pipe around its own axis (an operation which usually is carried out by the plumber upon the installation of the pipe), they run the risk of damage or even breaks which clearly may cause the loss of tightness of the seal, as has already occurred and can be proven.

SUMMARY AND OBJECTS OF THE INVENTION

The primary object of the invention is to prevent such drawbacks simply and effectively with the application of a third toric seal on the said rubber holder close to the free end of same.

According to the invention, a pipe press fitting for connecting plastic, multilayered and rubber material pipes is provided. The fitting includes an outer bushing and a body having one of a generally linear shape, a generally elbow-shape and a generally T-shape. The body includes a rubber-holder section with a first groove outer surface and a second groove outer surface spaced in parallel to said first grove outer surface. A threaded section for threading the body rubber holder section to a pipe and locking the body rubber holder section to the pipe in cooperation with said outer bushing is provided which is shaped by means of pressing. Toric seals are provided spaced in parallel to one another and seated in said first groove outer surface and said second groove outer surface respectively. A third toric seal for the sealing between the said rubber holder section and the pipe connected thereto is also provided.

The adoption of the third toric seal guarantees the absolute tightness of the connection due to the fact that it is not absolutely deflected, but remains compressed to the extent so as to guarantee the hydraulic seal, according to the technique of dimensional tolerances used in machinery, and thus, free to rotate in its own seat with maximum safety, even if stressed by repeated rotations of the pipe.

To guarantee the efficiency of the third seal, the bushing is dimensioned in such a manner that it completely hangs over the third seal and maintains the dimensional stability of the pipe even in cases of marked bendings of the pipe close to the fitting or high water temperatures, which might create dimensional deformations so as to compromise the action of the third sealing point.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawing:

The only figure of the attached drawing shows an exemplary embodiment of the present invention, and specifically a partial section of a fitting and a pipe that are joined.

DESCRIPTION OF THE PREFERRED EMBODIMENT

Referring to the drawings in particular the fitting comprises a body 10 and a rubber holder 11, which are made in one piece. The body 10, which is shown only partially, may be linear, elbow-shaped, T-shaped, etc., with or without a male or female threaded section. The rubber holder 11 has a corrugated or grooved outer surface 12 and it has a first toric seal 13 and a second toric seal 14 arranged in corresponding annular seats 13', 14'.

According to the present utility model, the rubber holder 11 has, close to its free end, a third annular seat 15' for a third toric seal 15.

The pipe 16 to be connected to the fitting is threaded on the said rubber holder 11 and is locked there by means of an outer bushing 17.

This bushing 17 is pressed with the suitable equipment on the pipe in the section which runs from the body to the second seal 14. Moreover, the bushing extends with an additional cylindrical section 17' up to the end of the rubber holder so as to completely hang over the third seal 15 without deflecting it, with the results and advantages mentioned above.

While a specific embodiment of the invention has been shown and described in detail to illustrate the application of the principles of the invention, it will be understood that the invention may be embodied otherwise without departing from such principles.

What is claimed is:

1. A pipe press fitting for connecting plastic, multilayered and rubber material pipes, the fitting comprising:
    an outer bushing;
    a body including a rubber-holder section with a first groove outer surface and a second groove outer surface spaced in parallel to said first groove outer surface, a corrugated section for threading the body rubber holder section to a pipe and locking the body rubber holder section to the pipe in cooperation with said outer bushing that is shaped by means of pressing;
    toric seals spaced from one another along a longitudinal axis of said holder section and each of said toric seals lying in separate parallel planes, said toric seals being seated in said first groove outer surface and said second groove outer surface respectively; and
    a third toric seal for the sealing between the said rubber holder section and the pipe connected thereto, said third toric seal rotatable with respect to said holder section under compression by said outer bushing.

2. The pipe fitting in accordance with claim 1, wherein said rubber holder section has an additional peripheral seat formed of another groove outer surface spaced in parallel to said first groove outer surface, said additional peripheral seat being provided for said third toric seal.

3. The pipe fitting in accordance with claim 2, wherein said additional peripheral seat for said third toric seal is close to a free end of said rubber holder.

4. The pipe fitting in accordance with claim 3 in wherein said outer bushing extends lengthwise to a location at which a cylindrical section of said outer bushing hangs over said third toric seal.

5. A press fitting for a pipe, the press fitting comprising:

a body including a holder section insertable into an end of the pipe, said holder defining a plurality of annular seats;

a plurality of toric seals, each of said plurality of toric seals being positioned in one of said annular seats;

an outer bushing positionable around the end of the pipe when said holder section is positioned in the end of the pipe, said outer bushing being compressable around the end of the pipe to seat the pipe to said holder section, one of said annular seats and a corresponding said toric seal being non-rotatably held on to one of said holder section and the pipe by compression of said outer bushing, another one of said annular seats and a corresponding another said toric seal being rotatable with respect to one of said holder section and the pipe by compression of said outer bushing.

6. The press fitting in accordance with claim 5, wherein:

said another toric seal is rotatable with respect to said another annular seat when said outer bushing is compressed to seal the pipe to said holder section.

7. The press fitting in accordance with claim 5, wherein:

said holder section and said outer bushing are tubular;

each of said annular rings lie in planes substantially parallel to each other;

each of said annular rings are spaced from each other in a longitudinal direction of said holder section;

said holder section is formed of rubber.

8. The press fitting in accordance with claim 5, wherein:

said one of said annular seats and said one corresponding toric seal are positioned closer to the end of the pipe than said another annular seat and said another corresponding toric seal.

9. The press fitting in accordance with claim 5, wherein:

two of said annular seats and a corresponding two of said toric seals are non-rotatably held on to one of said holder section and the pipe by compression of said outer bushing.

10. The press fitting in accordance with claim 9, wherein:

said two of said annular seats and said two corresponding toric seal are positioned closer to the end of the pipe than said another annular seat and said another corresponding toric seal.

11. The press fitting in accordance with claim 5, wherein:

said holder section includes a corrugated outer surface.

12. A pipe connection comprising:

a pipe having an end;

a body including a holder section inserted into said end of said pipe, said holder defining a plurality of annular seats;

a plurality of toric seals, each of said plurality of toric seals being positioned in one of said annular seats;

an outer bushing positioned around the end of the pipe with said holder section positioned in said end of said pipe, said outer bushing being compressed around the end of the pipe to seal the pipe to said holder section, one of said annular seats and a corresponding said toric seal being non-rotatably held on to one of said holder section and the pipe by compression of said outer bushing, another one of said annular seats and a corresponding another said toric seal being rotatably held with respect to one of said holder section and the pipe by compression of said outer bushing.

\* \* \* \* \*